United States Patent
Huang et al.

(10) Patent No.: US 8,514,200 B2
(45) Date of Patent: Aug. 20, 2013

(54) CAPACITIVE TOUCH DISPLAY PANEL AND CAPACITIVE TOUCH BOARD

(75) Inventors: Yen-Liang Huang, Hsin-Chu (TW);
Wei-Hung Kuo, Hsin-Chu (TW);
Tun-Chun Yang, Hsin-Chu (TW);
Seok-Lyul Lee, Hsin-Chu (TW);
Wei-Ming Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 649 days.

(21) Appl. No.: 12/766,934

(22) Filed: Apr. 26, 2010

(65) Prior Publication Data
US 2011/0157071 A1    Jun. 30, 2011

(30) Foreign Application Priority Data
Dec. 30, 2009  (TW) .............................. 98145952 A (51) Int. Cl.
  *G06F 3/045*       (2006.01)
(52) U.S. Cl.
  USPC .......................................... 345/174; 345/173
(58) Field of Classification Search
  USPC ................................................. 345/173–178
  See application file for complete search history.

(56) References Cited

U.S. PATENT DOCUMENTS

| | | |
|---|---|---|
| 6,175,394 B1 | 1/2001 | Wu |
| 6,690,433 B2 | 2/2004 | Yoo |
| 7,158,194 B2 | 1/2007 | Lo |
| 7,280,327 B2 | 10/2007 | Lai |
| 7,324,351 B2 | 1/2008 | Aoki |
| 7,332,379 B2 | 2/2008 | Chen |
| 7,408,751 B1 | 8/2008 | Lien |
| 2008/0309633 A1 | 12/2008 | Hotelling |
| 2009/0284484 A1 | 11/2009 | Hwang |
| 2011/0057887 A1* | 3/2011 | Lin et al. ....................... 345/173 |

FOREIGN PATENT DOCUMENTS

| | | |
|---|---|---|
| TW | 594187 | 6/2004 |
| TW | I281569 | 5/2007 |
| TW | 200824127 | 6/2008 |
| TW | 200950611 | 12/2009 |

* cited by examiner

*Primary Examiner* — Kevin M Nguyen
*Assistant Examiner* — Kenneth B Lee, Jr.
(74) *Attorney, Agent, or Firm* — Winston Hsu; Scott Margo (57) ABSTRACT

A capacitive touch display panel includes a display panel, a touch sensing unit, and a plurality of floating gate type ESD protection devices. The touch sensing unit includes a plurality of first sensing pads and second sensing pads. Each floating gate type ESD protection device is disposed between two adjacent first sensing pads and between two adjacent second sensing pads. The two adjacent first sensing pads are electrically disconnected from each other, and the two adjacent second sensing pads are electrically disconnected from each other.

18 Claims, 12 Drawing Sheets

CAPACITIVE TOUCH DISPLAY PANEL AND CAPACITIVE TOUCH BOARD

BACKGROUND OF THE INVENTION

1. Field of the Invention

The present invention relates to a capacitive touch display panel and a capacitive touch board, and more particularly, to a capacitive touch display panel and a capacitive touch board having floating gate type electrostatic discharge (ESD) protection devices disposed in a sensing region.

2. Description of the Prior Art

In present consumer electronics, tablet mobile phones, global positioning systems (GPS), multimedia players and other portable electronic devices widely use touch panels as the data communicational interface between human and the electronic devices. Because designs of the present consumer electronics stress small size, traditional inputting devices, such as keypad and mouse, which occupy some spaces of the present consumer electronics, are desired to be saved in the product design, so that the inputting method for the present consumer electronics adopts a touching method. In addition, with appearance of the operating system (OS) software for the touching method, requirements for the touch panel can be expected to further raise.

A capacitive touch panel is a mainstream of the present touch panel. However, in the duration of manufacture or usage, the capacitive touch panel often generates electrostatic discharge (ESD) due to rub or other reasons. Therefore, too many electrostatic charges may result in the damage of the touch sensing unit, so that the yield and the reliability of the capacitive touch panel is reduced.

SUMMARY OF THE INVENTION

It is one of the objectives of the present invention to provide a capacitive touch display panel and a capacitive touch board to raise electrostatic discharge (ESD) protection.

According to the present invention, the present invention provides a capacitive touch display panel comprising a display panel, a touch sensing unit and a plurality of floating gate type ESD protection devices. The display panel comprises a sensing region. The touch sensing unit is disposed in the sensing region of the display panel, and the touch sensing unit comprises a plurality of first sensing series disposed along a first direction and a plurality of second sensing series disposed along a second direction. Each of the first sensing series comprises a plurality of first sensing pads electrically connected to each other, and each of the second sensing series comprises a plurality of second sensing pads electrically connected to each other. The floating gate type ESD protection devices are disposed in the sensing region of the display panel, wherein each floating gate type ESD protection device is disposed between two adjacent first sensing pads and between two adjacent second sensing pads. The two adjacent first sensing pads are electrically disconnected from each other, and the two adjacent second sensing pads are electrically disconnected from each other.

According to the present invention, the present invention provides a capacitive touch board comprising a substrate, a touch sensing unit and a plurality of floating gate type ESD protection devices. The substrate has a sensing region. The touch sensing unit is disposed in the sensing region of the substrate, and the touch sensing unit comprises a plurality of first sensing series disposed along a first direction and a plurality of second sensing series disposed along a second direction. Each of the first sensing series comprises a plurality of first sensing pads electrically connected to each other, and each of the second sensing series comprises a plurality of second sensing pads electrically connected to each other. The floating gate type ESD protection devices are disposed in the sensing region of the substrate. Each floating gate type ESD protection device is disposed between two adjacent first sensing pads and between two adjacent second sensing pads. The two adjacent first sensing pads are electrically disconnected from each other, and the two adjacent second sensing pads are electrically disconnected from each other.

The capacitive touch device of the present invention disposes the floating gate type ESD protection device in the sensing region, so that the ESD protection ability of the capacitive touch device can be effectively enhanced.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be detailed as follows. The preferred embodiments of the present invention are illustrated in the accompanying drawings with numbered elements to elaborate the contents and effects to be achieved.

Figure 1:
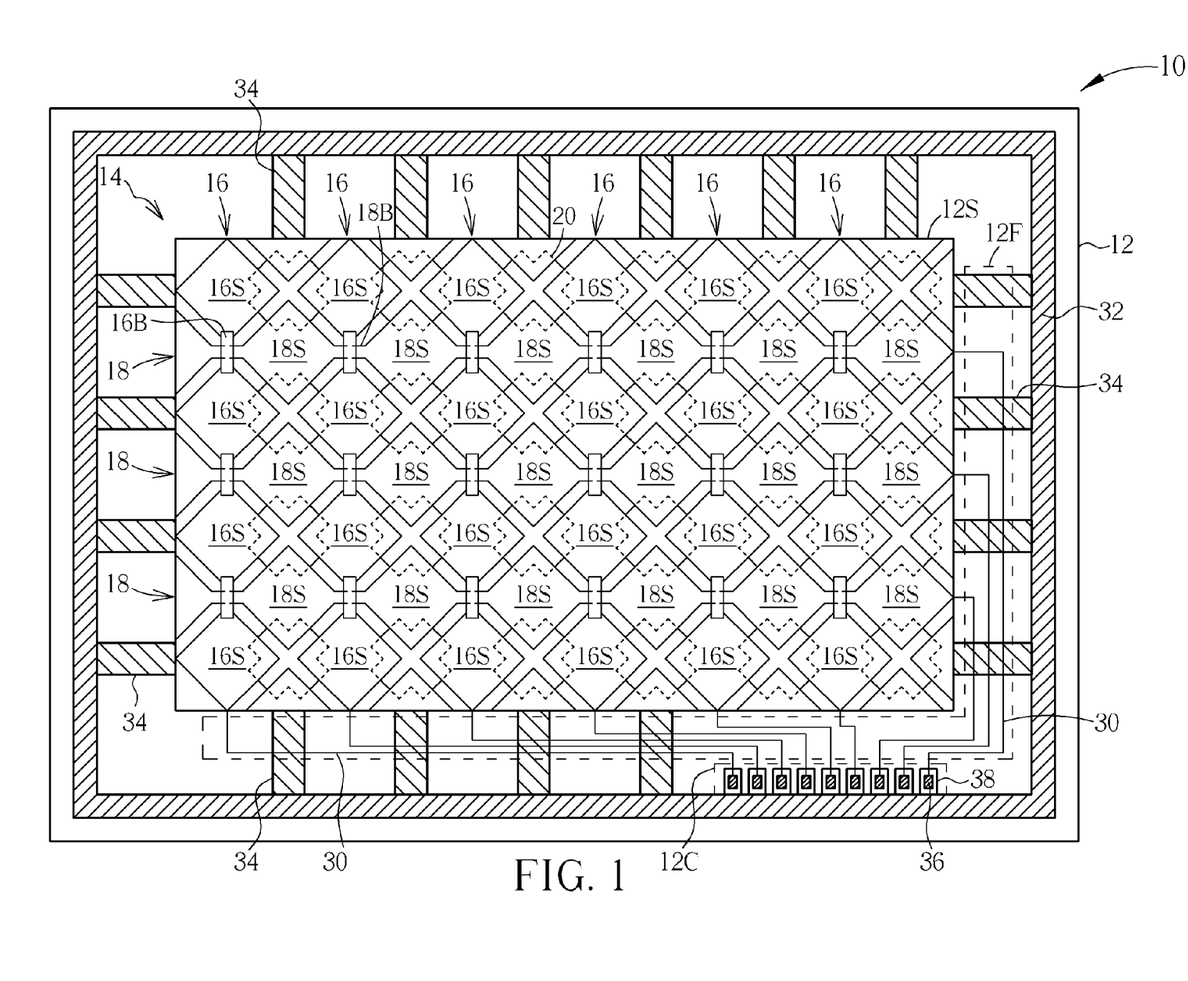
FIG. 1 is a schematic diagram illustrates a capacitive touch device according to a preferred embodiment of the present invention.

Please refer to FIG. 1, which is a schematic diagram illustrates a capacitive touch device according to a preferred embodiment of the present invention. FIG. 1 illustrates an embodiment of the present invention in order to easily understand the present invention, and does not limit the scope of the present invention. The detailed ratio of the present invention can be adjusted according to designed requirements. In this embodiment, the capacitive touch device can be a capacitive touch display panel having double functions of touch input and display. In other words, the capacitive touch sensing unit is integrated into a manufacturing process for a display panel, such as a liquid crystal display panel. But, the present invention is not limited to this. For example, the capacitive touch device also can be the capacitive touch substrate only having touch inputting function, and a capacitive touch display panel can be formed by utilizing an attaching method to combine the capacitive touch substrate with a display panel. As shown in FIG. 1, the capacitive touch device 10 of this embodiment includes a display panel 12, a touch sensing unit 14 disposed on the display panel 12 and a plurality of floating gate type electrostatic discharging (ESD) protection devices 20 disposed on the display panel 12. The display panel 12 has a sensing region 12S defined thereon. It is worthy to say that when the capacitive touch device 10 is the capacitive touch substrate only having touch inputting function, the display panel 12 can be replaced with a substrate, such as a glass substrate, a plastic substrate or a printed circuit board, etc., and the display panel 12 is applied to other devices that require touch input. The touch sensing unit 14 is disposed in the sensing region 12S of the display panel 12, and the touch sensing unit 14 includes a plurality of first sensing series 16 disposed along a first direction (as shown by a vertical direction in FIG. 1) and a plurality of second sensing series 18 disposed along a second direction (as shown by a horizontal direction in FIG. 1). Each of the first sensing series 16 includes a plurality of first sensing pads 16S electrically connected to each other, and each of the second sensing series 18 includes a plurality of second sensing pads 18S electrically connected to each other. When the touch input is performed, a finger of a user or other input devices can be combined with a part of the corresponding first sensing pads 16S and the corresponding second sensing pads 18S to form a capacitor, so that an effect of touch input can be achieved. The floating gate type ESD protection devices 20 are disposed in the sensing region 12S, and each floating gate type ESD protection device 20 is disposed between two adjacent first sensing pads 16S and between two adjacent second sensing pads 18S. The two adjacent first sensing pads 16S are electrically disconnected from each other, i.e. not directly electrically connected to each other, and the two adjacent second sensing pads 18S are electrically disconnected from each other, i.e. not directly electrically connected to each other. The floating gate type ESD protection devices 20 provide ESD protection, and the following description will detail a structure and an ESD protection principle of each floating gate type ESD protection device 20.

Figure 2:
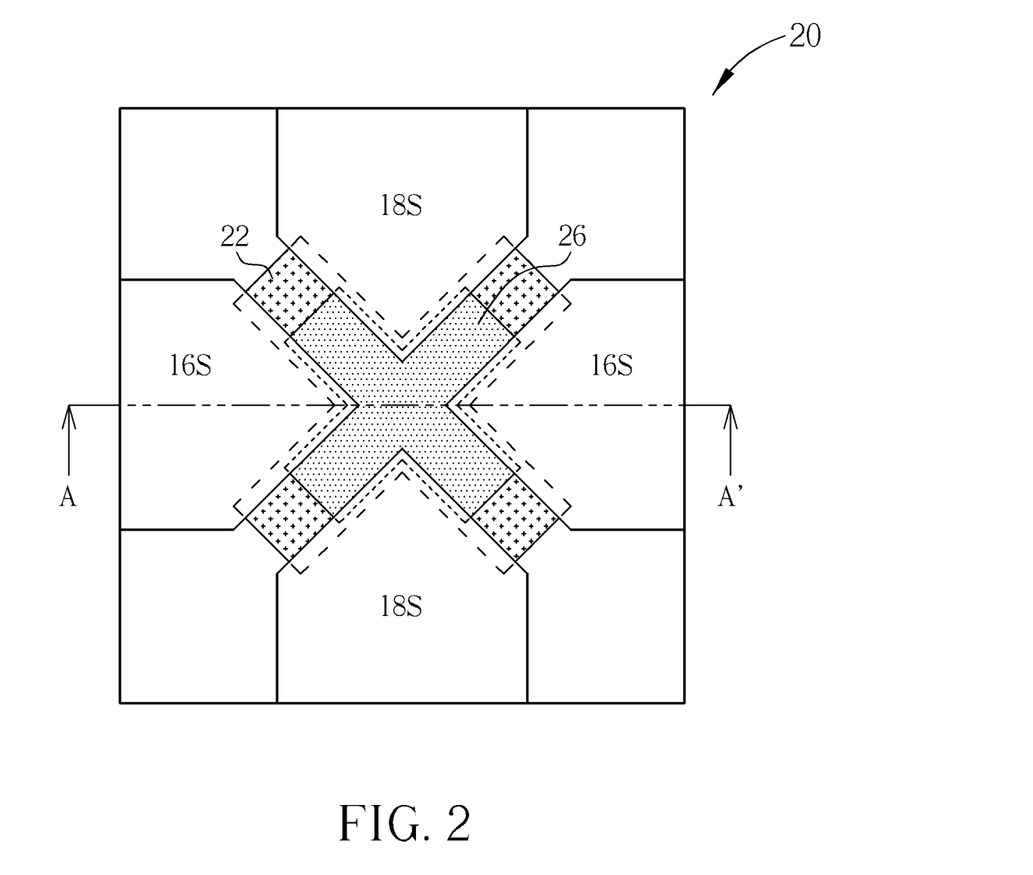
FIG. 2 is a schematic diagram illustrating a top view of the floating gate type ESD protection device according to this embodiment.
Figure 3:
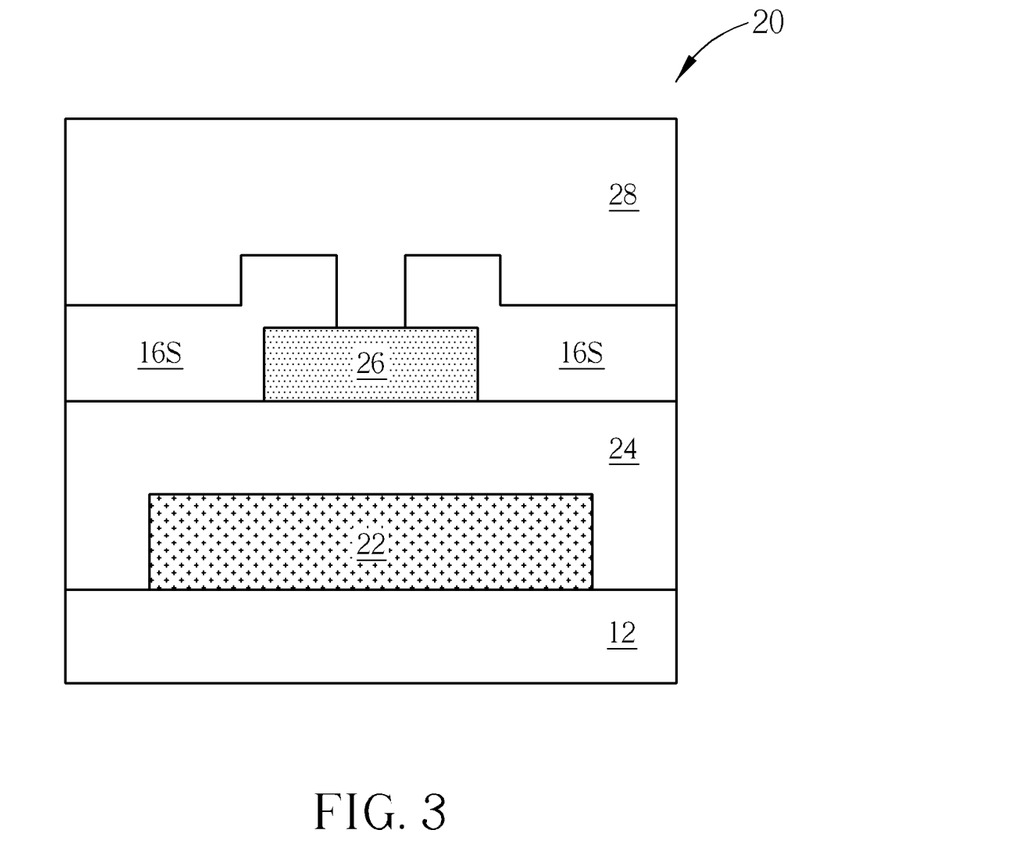
FIG. 3 is a schematic diagram illustrating a cross-sectional view of the floating gate type ESD protection device along line AA' in FIG. 2 according to this embodiment.

Please refer to FIG. 2 and FIG. 3, which are enlarged schematic diagrams illustrating a region of each floating gate type ESD protection device, and refer to FIG. 1 together. FIG. 2 is a schematic diagram illustrating a top view of the floating gate type ESD protection device according to this embodiment. FIG. 3 is a schematic diagram illustrating a cross-sectional view of the floating gate type ESD protection device along line AA' in FIG. 2 according to this embodiment. As shown in FIG. 2 and FIG. 3, each floating gate type ESD protection device 20 includes a patterned conductive layer 22, such as a patterned metal layer, a dielectric layer 24, a patterned semiconductor layer 26, such as a amorphous silicon layer, connected to the adjacent first sensing pads 16S or the adjacent second sensing pads 18S. In addition, an insulating layer 28 covers the floating gate type ESD protection device 20, the adjacent first sensing pads 16S and the adjacent second sensing pads 18S, so that the floating gate type ESD protection device 20, the adjacent first sensing pads 16S and the adjacent second sensing pads 18S can be protected. The patterned semiconductor layer 26 of each floating gate type ESD protection device 20 is in contact with and partially overlaps two adjacent first sensing pads 16S which are electrically disconnected from each other and two adjacent second sensing pads 18S which are electrically disconnected from each other, respectively. The patterned conductive layer 22 of each floating gate type ESD protection device 20 partially overlaps the first sensing pads 16S and the second sensing pads 18S, respectively. In this embodiment, the patterned conductive layer 22 is disposed on the display panel 12. The dielectric layer 24 is disposed on patterned conductive layer 22. The patterned semiconductor layer 26 is disposed on the dielectric layer 24. The first sensing pads 16S and the second sensing pads 18S are disposed on the patterned semiconductor layer 26. The insulating layer 28 covers the first sensing pads 16S, the second sensing pads 18S and the patterned semiconductor layer 26. The material of the dielectric layer 24 can be any kind of organic or inorganic dielectric material, and is preferable to a dielectric material with low-k, so that the damage resulted from the electrostatic charges can be reduced. In addition, the thickness of the dielectric layer 24 can be adjusted according to the requirements, and the dielectric layer 24 also can be manufactured to be a patterned layer as long as the patterned conductive layer 22 is covered. In each floating gate type ESD protection device 20 of this embodiment, the patterned conductive layer 22 provides a function of a gate. The dielectric layer 24 provides a function of a gate dielectric layer. The patterned semiconductor layer 26 is used as a channel. The two adjacent first sensing pads 16S which are electrically disconnected from each other and two adjacent second sensing pads 18S which are electrically disconnected from each other are used as source/drain. By disposing the floating gate type ESD protection device 20, when the electrostatic charges accumulate at the touch sensing unit 14 due to the capacitive touch panel device 10 being rubbed or other reasons, a large number of electrostatic charges induce the floating gate type ESD protection device 20 to turn on. That is to say that a large number of electrostatic charges at the first sensing pads 16S or the second sensing pads 18S are coupled to the patterned conductive layer 22 to form an electric potential, so that the patterned semiconductor layer 26 is turned on. The floating gate type ESD protection device 20 is therefore turned on. In the meantime, the electrostatic charges accumulated at the specific first sensing pad 16S or second sensing pad 18S can be rapidly transferred to the adjacent first sensing pad 16S or the adjacent second sensing pad 18S. If the number of the electrostatic charges is still too many, the adjacent floating gate type ESD protection device 20 still will be induced to turn on, and the electrostatic charges are continuously transferred to the adjacent first sensing pad 16S or the adjacent second sensing pad 18S. For this reason, a bridge line 16B used to connect the adjacent first sensing pads 16S or a bridge line 18B used to connect the adjacent second sensing pads 18B can be prevented from being burned out by the overlarge electrostatic charges, so that the ESD protection is achieved.

Figure 4:
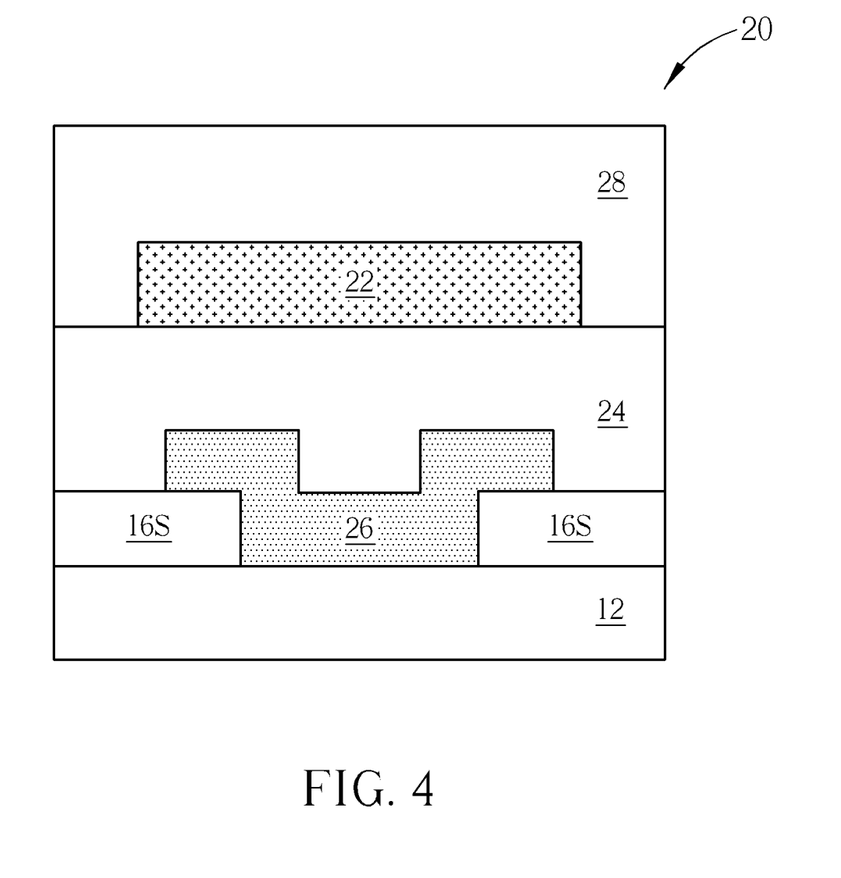
FIG. 4 is a schematic diagram illustrating a cross-sectional view of a floating gate type ESD protection device according to another embodiment of the present invention.

In the above-mentioned embodiment, the patterned conductive layer 22 of the floating gate type ESD protection device 20 is disposed on the display panel 12. The dielectric layer 24 is disposed on the patterned conductive layer 22. The patterned semiconductor layer 26 is disposed on the dielectric layer 24. The first sensing pads 16S and the second sensing pads 18S are disposed on the patterned semiconductor layer 26. The patterned conductive layer 22 can be selectively manufactured with the bridge line 18B between the second sensing pads 18S, and the dielectric layer 24 can be selectively manufactured with the dielectric layer (not shown in figure) between the bridge line 18B and the bridge line 16B. Therefore, the manufacturing process can be simplified, and manufacturing cost can be reduced. But, the present invention is not limited to this. The structure of the floating gate type ESD protection device in the present invention is not limited to this, and can be other embodiments. Please refer to FIG. 4, and refer to FIG. 1 together. FIG. 4 is a schematic diagram illustrating a cross-sectional view of a floating gate type ESD protection device according to another embodiment of the present invention. As shown in FIG. 4, the patterned semiconductor layer 26 of each floating gate type ESD protection device 20 is disposed on the display panel 12. The dielectric layer 24 of each floating gate type ESD protection device 20 is disposed on the patterned semiconductor layer 26, the first sensing pad 16S and the second sensing pad 18S (not shown in FIG. 4). The patterned conductive layer 22 of each floating gate type ESD protection device 20 is disposed on the dielectric layer 24.

Figure 5:
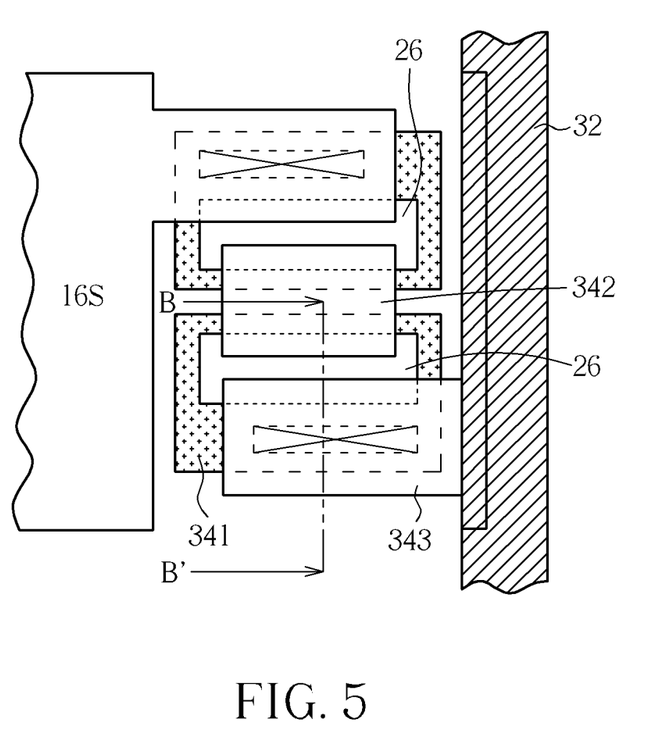
FIG. 5 is a schematic diagram illustrating a top view of a connection line region ESD protection device according to this embodiment.
Figure 6:
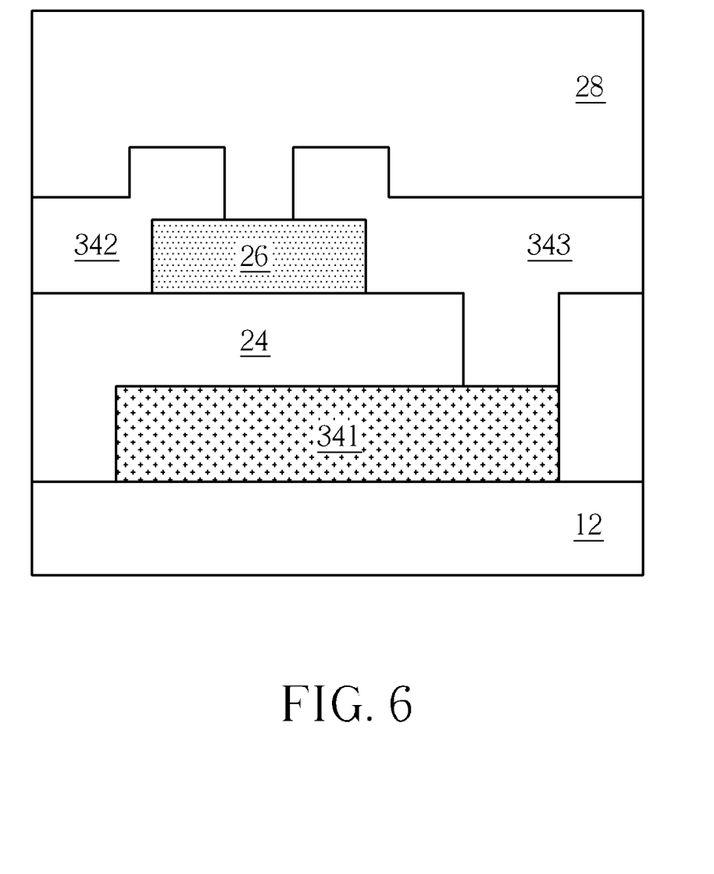
FIG. 6 is a schematic diagram illustrating a cross-sectional view of the connection line region ESD protection device along line BB' in FIG. 5 according to this embodiment.

As the above-mentioned description, the present invention utilizes the floating gate type ESD protection device 20 disposed in the sensing region 12S to provide the ESD protection that the capacitive touch device 10 requires, but the capacitive touch device 10 of the present invention can selectively dispose extra ESD protection devices at periphery of the display panel 12, such as a connection line region and a contact pad region, to further enhance the ESD protection. Please refer to FIG. 5 and FIG. 6, and refer to FIG. 1 together. FIG. 5 and FIG. 6 are schematic diagrams illustrating a connection line region ESD protection device according to a preferred embodiment of the present invention. FIG. 5 is a schematic diagram illustrating a top view of the connection line region ESD protection device according to this embodiment, and FIG. 6 is a schematic diagram illustrating a cross-sectional view of the connection line region ESD protection device along line BB' in FIG. 5 according to this embodiment. As shown in FIG. 1, the display panel 12 of the capacitive touch device 10 further includes a connection line region (or fan out region) 12F, a plurality of connection lines 30 disposed in the connection line region 12F, a guard ring 32 disposed in the connection line region 12F, and a plurality of connection line region ESD protection devices 34. The connection lines 30 respectively electrically connect the first sensing series 16 and the second sensing series 18 for transferring signals that the touch sensing unit 14 receives. Each connection line region ESD protection device 34 is electrically connected to the corresponding connection line 30 and the guard ring 32, respectively. As shown in FIG. 1, FIG. 5 and FIG. 6, in this embodiment, the connection line region ESD protection device 34 is a diode ESD protection device, which includes a transistor device or several transistor devices. The transistor device includes a gate 341, a dielectric layer 24, a patterned semiconductor layer 26, two source/drain 342, 343 and an insulating layer 28. The source/drain 342 is electrically connected to the corresponding first sensing series 16 or second sensing series 18, and the source/drain 343 is electrically connected to the gate 341 and the guard ring 32. By the above-mentioned connecting method, the transistor device can have a character of diode device, so that the connection line region ESD protection device 34 of this embodiment can provide ESD protection.

Figure 7:
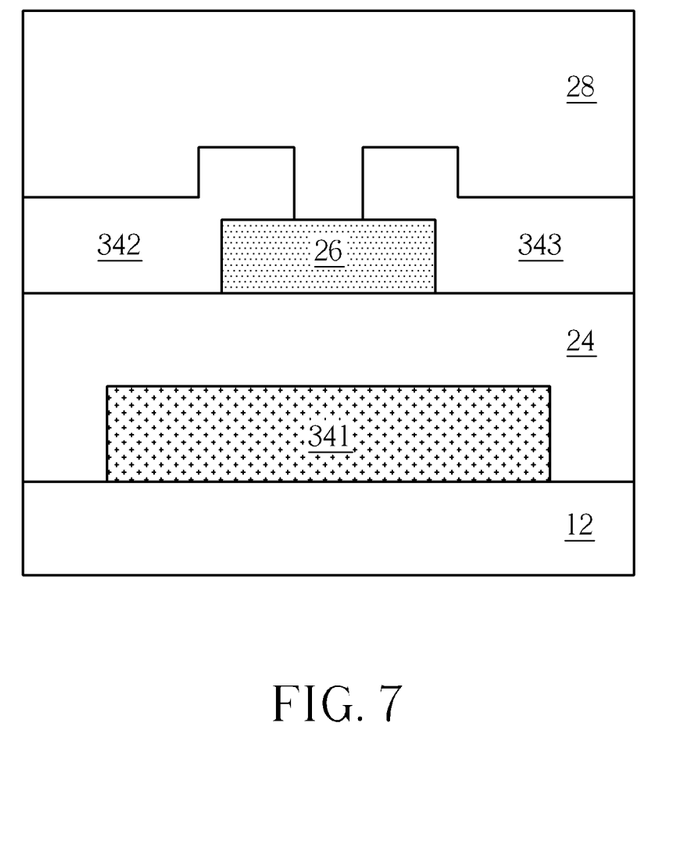
FIG. 7 is a schematic diagram illustrating a connection line region ESD protection device according to another preferred embodiment of the present invention.

Please refer to FIG. 7, and refer to FIG. 1 together. FIG. 7 is a schematic diagram illustrating a connection line region ESD protection device according to another preferred embodiment of the present invention. As shown in FIG. 1 and FIG. 7, the connection line region ESD protection device 34 of this embodiment also can be a floating gate type ESD protection device, which includes a gate 341, a dielectric layer 24, a patterned semiconductor layer 26, two source/drain 342, 343 and an insulating layer 28. The source/drain 342 is electrically connected to the corresponding first sensing series 16 or second sensing series 18, and the source/drain 343 is electrically connected to the guard ring 32. Different from the previous embodiment, the source/drain 343 of the connection line region ESD protection device 34 in this embodiment is not electrically connected to the gate 341, but the floating gate type ESD protection device formed by the above-mentioned connecting method also can effectively provide ESD protection.

Figure 8:
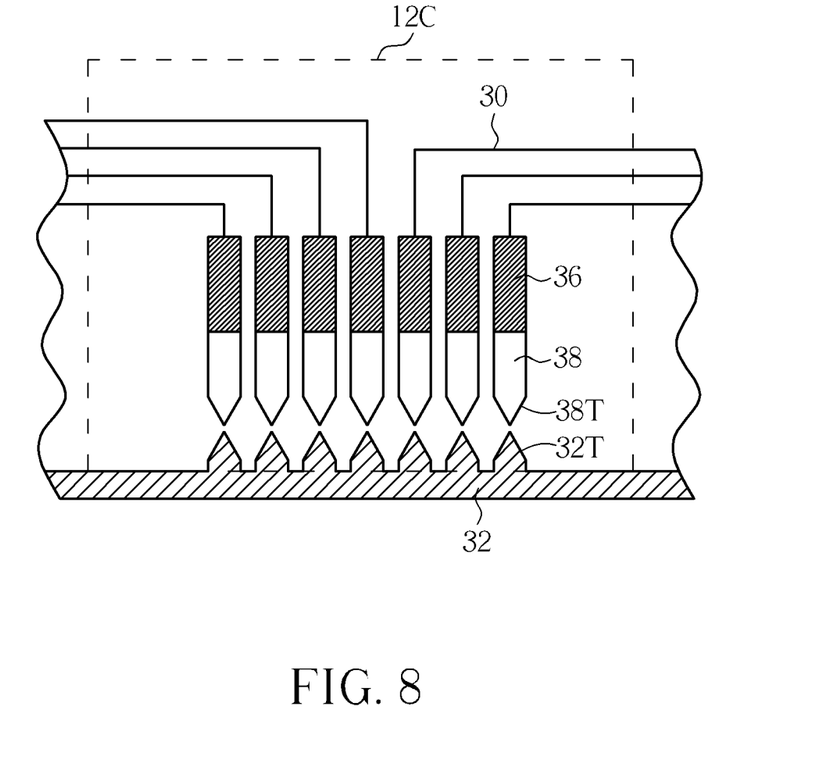
FIG. 8 is a schematic diagram illustrating a connection line region ESD protection device according to a preferred embodiment of the present invention.

Please refer to FIG. 8, and refer to FIG. 1 together. FIG. 8 is a schematic diagram illustrating a connection line region ESD protection device according to a preferred embodiment of the present invention. As shown in FIG. 1, the display panel 12 of the capacitive touch device 10 further includes a contact pad region 12C, a plurality of contact pads 36 disposed in the contact pad region 12C and a plurality of contact pad region ESD protection devices 38 disposed in the contact pad region 12C. Each contact pad 36 is electrically connected to a corresponding connection line 30, and each contact pad region ESD protection device 38 is respectively electrically connected to a corresponding contact pad 36. As shown in FIG. 1 and FIG. 8, each contact pad region ESD protection device 38 includes a discharging tip 38T, and the guard ring 32 also includes a plurality of discharging tips 32T disposed respectively corresponding to the discharging tip 38T of each contact pad region ESD protection device 38. By the design of the discharging tips 38T, 32T, the electrostatic charges accumulated at the contact pads 36 can be effectively transferred to the guard ring 32, and the guard ring 32 can be electrically connected to the ground or other ESD protection circuits, so that the electrostatic charges can be transferred to an outside. Therefore, the ESD protection can be achieved.

Figure 9:
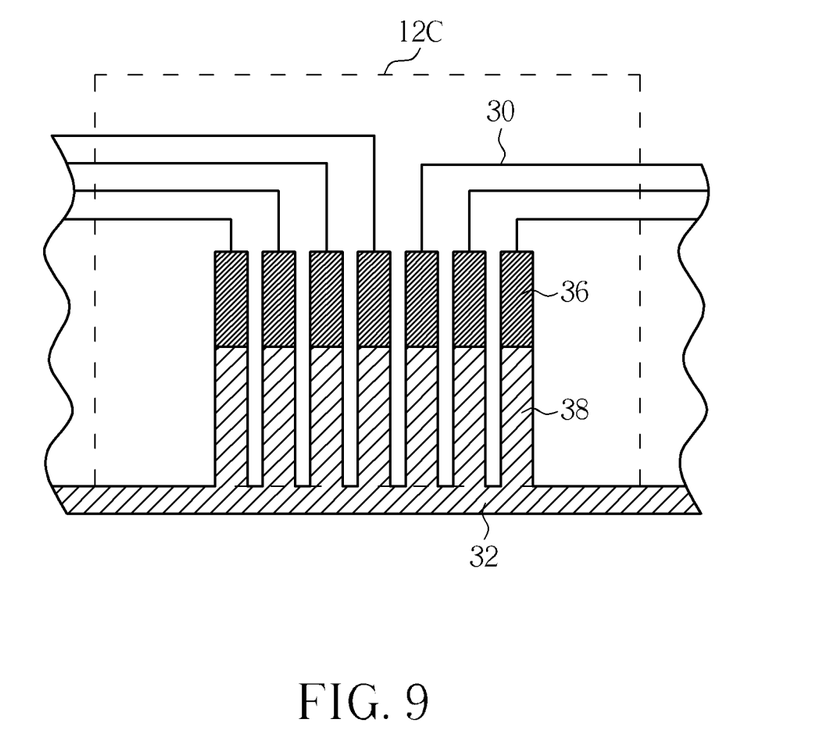
FIG. 9 is a schematic diagram illustrating a connection line region ESD protection device according to another preferred embodiment of the present invention.

Please refer to FIG. 9, which is a schematic diagram illustrating a connection line region ESD protection device according to another preferred embodiment of the present invention. As shown in FIG. 9, different from the previous embodiment, in this embodiment, the contact pad region ESD protection devices 38 is directly electrically connected to the guard ring 32, so that the contact pad region ESD protection devices 38 also provide ESD protection. Furthermore, the electrical connection between each contact pad region ESD protection device 38 and the guard ring 32 will be cut off in the following process, so that a problem of short circuit between the capacitive touch device and each contact pad 36 will not be generated in actual operation.

Figure 10:
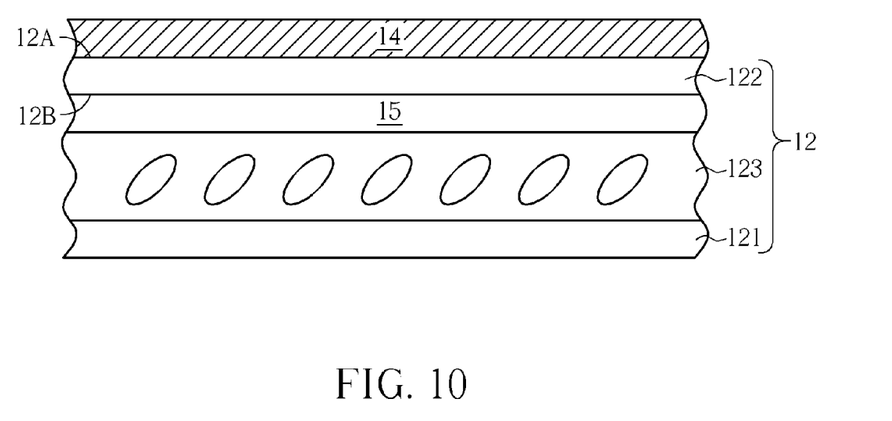
FIG. 10 is a schematic diagram illustrating a capacitive touch device according to a preferred embodiment of the present invention.

As the above-mentioned description, the capacitive touch device can be a capacitive touch display panel having double functions of touch input and display or the capacitive touch substrate only having touch inputting function, and the capacitive touch substrate can be combined with a display panel by an attaching method to form a capacitive touch display panel. Therefore, according to different position that the touch sensing unit, the capacitive touch device of the present invention has the following different embodiment. Please refer to FIG. 10, which is a schematic diagram illustrating a capacitive touch device according to a preferred embodiment of the present invention. As shown in FIG. 10, for example, the display panel 12 can be a liquid crystal display panel, an organic light-emitting display panel, a plasma display panel, an electrophoresis display panel, etc., but is not limited to this. This embodiment takes the liquid crystal display panel as an example, and the display panel 12 includes an array substrate 121, a color filter substrate 122 and a liquid crystal layer 123 disposed between the array substrate 121 and the color filter substrate 122. An outside of the display panel 12 has an outside surface, such as an outside surface of the color filter substrate 122, and an inside surface, such as an inside surface of the color filter substrate 122. The display panel 12 can further include a color filter layer 15 disposed on the inside surface 12B. In this embodiment, the touch sensing unit 14 is disposed on the outside surface 12A of the display panel 12.

Figure 11:
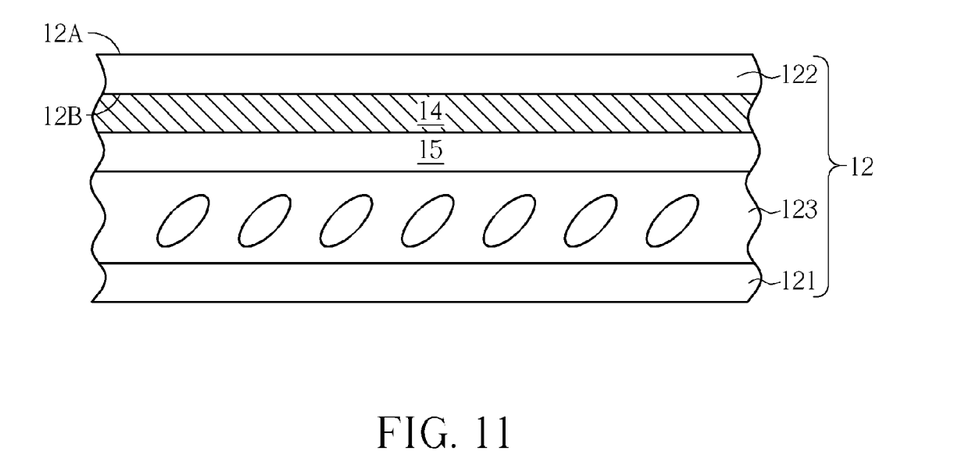
FIG. 11 is a schematic diagram illustrating a capacitive touch device according to another preferred embodiment of the present invention.

Please refer to FIG. 11, which is a schematic diagram illustrating a capacitive touch device according to another preferred embodiment of the present invention. As shown in FIG. 11, in this embodiment, the touch sensing unit 14 can be disposed on the inside surface 12B of the display panel 12.

Figure 12:
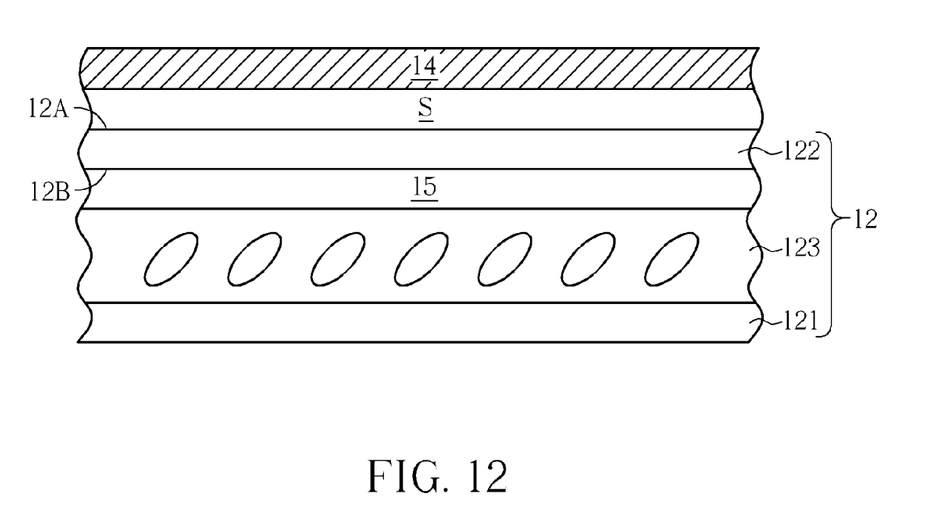
FIG. 12 is a schematic diagram illustrating a capacitive touch device according to another preferred embodiment of the present invention.

Please refer to FIG. 12, which is a schematic diagram illustrating a capacitive touch device according to another preferred embodiment of the present invention. As shown in FIG. 12, in this embodiment, the capacitive touch device further includes an assistant substrate S. The touch sensing unit 14 can be disposed on the assistant substrate S, and the assistant substrate S can be attached to the display panel 12.

In summary, the capacitive touch device of the present invention utilizes the floating gate type ESD protection devices disposed in the sensing region to enhance the ESD protection ability, and in order to raise the ESD protection ability, various kinds of ESD protection devices can be added into the connection line region and the contact pad region. Therefore, whether the capacitive touch device is a capacitive touch display panel or a capacitive touch substrate, the capacitive touch device can provide a better ESD protection ability.

Those skilled in the art will readily observe that numerous modifications and alterations of the device and method may be made while retaining the teachings of the invention.

What is claimed is:

1. A capacitive touch display panel, comprising:
a display panel, comprising a sensing region;
a touch sensing unit, disposed in the sensing region of the display panel, the touch sensing unit comprising:
a plurality of first sensing series, disposed along a first direction, wherein each of the first sensing series comprises a plurality of first sensing pads electrically connected to each other; and
a plurality of second sensing series, disposed along a second direction, wherein each of the second sensing series comprises a plurality of second sensing pads electrically connected to each other; and
a plurality of floating gate type electrostatic discharge (ESD) protection devices, disposed in the sensing region of the display panel, each floating gate type ESD protection device comprising a patterned conductive layer, a dielectric layer and a patterned semiconductor layer, each floating gate type ESD protection device being disposed between two adjacent first sensing pads and two adjacent second sensing pads, wherein the two adjacent first sensing pads are not directly electrically connected to each other, and the two adjacent second sensing pads are not directly electrically connected to each other, wherein the patterned semiconductor layer of each floating gate type ESD protection device partially overlaps the two adjacent first sensing pads which are not directly electrically connected to each other and the two adjacent second sensing pads which are not directly electrically connected to each other, wherein the patterned conductive layer of each floating gate type ESD protection device is disposed on the display panel, the dielectric layer is disposed on the patterned conductive layer, the patterned semiconductor layer is disposed on the dielectric layer, and the first sensing pads and the second sensing pads are disposed on the patterned semiconductor layer.

2. The capacitive touch display panel of claim 1, wherein the display panel has an outside surface outside the display panel, and the touch sensing unit is disposed on the outside surface.

3. The capacitive touch display panel of claim 1, wherein the display panel has an inside surface inside the display panel, and the touch sensing unit is disposed on the inside surface.

4. The capacitive touch display panel of claim 3, further comprising a color filter layer disposed on the touch sensing unit.

5. The capacitive touch display panel of claim 2, further comprising an assistant substrate, the touch sensing unit being disposed on the assistant substrate, and the assistant substrate being attached to the display panel.

6. The capacitive touch display panel of claim 1, further comprising a connection line region and a plurality of connection lines disposed in the connection line region, wherein the connection lines are electrically connected to the first sensing series and the second sensing series respectively.

7. The capacitive touch display panel of claim 6, further comprising a guard ring disposed in the connection line region.

8. The capacitive touch display panel of claim 7, further comprising a plurality of connection line region ESD protection devices, wherein each connection line region ESD protection device is electrically connected to each corresponding first sensing series or each corresponding second sensing series respectively, and each connection line region ESD protection device is electrically connected to the guard ring.

9. The capacitive touch display panel of claim 8, wherein the connection line region ESD protection devices comprise a plurality of floating gate type ESD protection devices.

10. The capacitive touch display panel of claim 8, wherein the connection line region ESD protection devices comprise a plurality of diode ESD protection devices.

11. The capacitive touch display panel of claim 10, wherein each diode ESD protection device comprises at least one transistor device, and a gate and a source/drain of the transistor device are electrically connected to each other.

12. The capacitive touch display panel of claim 6, further comprising a contact pad region and a plurality of contact pads disposed in the contact pad region, wherein each contact pad is electrically connected to each corresponding connection lines respectively.

13. The capacitive touch display panel of claim 12, further comprising a guard ring.

14. The capacitive touch display panel of claim 13, further comprising a plurality of contact pad region ESD protection devices, disposed in the contact pad region, and each contact pad region ESD protection device respectively being electrically connected to each corresponding contact pads.

15. The capacitive touch display panel of claim 14, wherein each contact pad region ESD protection device comprises a discharging tip, and the guard ring comprises a plurality of discharging tips disposed respectively opposed to the discharging tip of each contact pad region ESD protection device.

16. The capacitive touch display panel of claim 14, wherein the contact pad region ESD protection device is electrically connected to the guard ring.

17. A capacitive touch board, comprising:
a substrate, having a sensing region;
a touch sensing unit, disposed in the sensing region of the substrate, the touch sensing unit comprising:
  a plurality of first sensing series, disposed along a first direction, wherein each of the first sensing series comprises a plurality of first sensing pads electrically connected to each other; and
  a plurality of second sensing series, disposed along a second direction, wherein each of the second sensing series comprises a plurality of second sensing pads electrically connected to each other; and
a plurality of floating gate type ESD protection devices, disposed in the sensing region of the substrate, each floating gate type ESD protection device comprising a patterned conductive layer, a dielectric layer and a patterned semiconductor layer, each floating gate type ESD protection device being disposed between two adjacent first sensing pads and two adjacent second sensing pads, wherein the two adjacent first sensing pads are not directly electrically connected to each other, and the two adjacent second sensing pads are not directly electrically connected to each other,
wherein the patterned semiconductor layer of each floating gate type ESD protection device partially overlaps the two adjacent first sensing pads which are not directly electrically connected to each other and the two adjacent second sensing pads which are not directly electrically connected to each other,
wherein the first sensing pads and the second sensing pads are disposed on the substrate, the patterned semiconductor layer of each floating gate type ESD protection device is disposed on the substrate, the dielectric layer is disposed on the patterned semiconductor layer, the first sensing pads and the second sensing pads, and the patterned conductive layer is disposed on the dielectric layer.

18. A capacitive touch board, comprising:
a substrate, having a sensing region;
a touch sensing unit, disposed in the sensing region of the substrate, the touch sensing unit comprising:
  a plurality of first sensing series, disposed along a first direction, wherein each of the first sensing series comprises a plurality of first sensing pads electrically connected to each other; and
  a plurality of second sensing series, disposed along a second direction, wherein each of the second sensing series comprises a plurality of second sensing pads electrically connected to each other; and
a plurality of floating gate type ESD protection devices, disposed in the sensing region of the substrate, each floating gate type ESD protection device comprising a patterned conductive layer, a dielectric layer and a patterned semiconductor layer, each floating gate type ESD protection device being disposed between two adjacent first sensing pads and two adjacent second sensing pads, wherein the two adjacent first sensing pads are not directly electrically connected to each other, and the two adjacent second sensing pads are not directly electrically connected to each other,
wherein the patterned semiconductor layer of each floating gate type ESD protection device partially overlaps the two adjacent first sensing pads which are not directly electrically connected from each other and the two adjacent second sensing pads which are not directly electrically connected from each other,
wherein the patterned conductive layer of each floating gate type ESD protection device is disposed on the substrate, the dielectric layer is disposed on the patterned conductive layer, the patterned semiconductor layer is disposed on the dielectric layer, and the first sensing pads and the second sensing pads are disposed on the patterned semiconductor layer.

* * * * *